United States Patent
Miwa et al.

(10) Patent No.: US 7,648,157 B2
(45) Date of Patent: Jan. 19, 2010

(54) AIRBAG APPARATUS

(75) Inventors: Kazuya Miwa, Tokyo (JP); Wataru Nakazawa, Tokyo (JP); Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 356 days.

(21) Appl. No.: 11/635,566

(22) Filed: Dec. 8, 2006

(65) Prior Publication Data

US 2007/0138768 A1 Jun. 21, 2007

(30) Foreign Application Priority Data

Dec. 19, 2005 (JP) ............................ 2005-365144

(51) Int. Cl.
*B60R 21/20* (2006.01)
(52) U.S. Cl. ................. 280/728.2; 280/728.1
(58) Field of Classification Search ............. 280/743.2, 280/743.1, 728.1, 728.2
See application file for complete search history.

(56) References Cited

U.S. PATENT DOCUMENTS

| | | | | |
|---|---|---|---|---|
| 4,963,412 A | * | 10/1990 | Kokeguchi .................. 428/137 |
| 5,062,664 A | * | 11/1991 | Bishop et al. ............. 280/728.2 |
| 5,195,775 A | | 3/1993 | Komerska et al. ........... 280/732 |
| 5,630,620 A | * | 5/1997 | Hirai et al. ................ 280/743.1 |
| 5,755,459 A | | 5/1998 | LaLonde |
| 5,765,863 A | | 6/1998 | Storey et al. |
| 5,836,611 A | * | 11/1998 | Palm ........................ 280/743.1 |
| 5,909,895 A | * | 6/1999 | Iino et al. ................. 280/743.1 |
| 6,206,409 B1 | | 3/2001 | Kato et al. |
| 6,371,510 B1 | | 4/2002 | Marriott et al. |
| 6,375,215 B1 | * | 4/2002 | Ross et al. ................ 280/728.3 |
| 6,413,597 B1 | * | 7/2002 | Hirai .......................... 428/35.2 |
| 6,607,796 B1 | * | 8/2003 | Hirai .......................... 428/35.2 |
| 6,749,924 B2 | * | 6/2004 | Monson et al. ............. 428/137 |
| 7,213,834 B2 | * | 5/2007 | Mizuno et al. ........... 280/730.1 |
| 7,213,837 B2 | * | 5/2007 | Clarke et al. ................ 280/731 |
| 7,350,801 B2 | * | 4/2008 | Nakayama ............... 280/730.1 |
| 7,431,330 B2 | * | 10/2008 | Korechika ............... 280/730.1 |
| 2002/0020995 A1 | * | 2/2002 | Abe et al. ................. 280/743.1 |
| 2002/0089155 A1 | | 7/2002 | Tajima et al. |
| 2005/0067816 A1 | * | 3/2005 | Buckman .................. 280/730.1 |

FOREIGN PATENT DOCUMENTS

| | | |
|---|---|---|
| DE | 202 15 165 U1 | 3/2003 |
| EP | 1 464 551 | 10/2004 |
| JP | H08-156733 | 6/1996 |
| JP | H11-28997 | 2/1999 |

* cited by examiner

*Primary Examiner*—Paul N Dickson
*Assistant Examiner*—Nicole Verley
(74) *Attorney, Agent, or Firm*—Manabu Kanesaka

(57) ABSTRACT

An airbag apparatus mounted on a motor vehicle is constructed such that a folded shape of an airbag is held by an airbag-holding member disposed in a manner to wrap an external surface of the folded airbag, which is housed in a retainer. The airbag-holding member is constructed such that a film sheet, in which a plurality of resin layers is laminated together, is configured to have a bag-shape that wraps around an entire external surface of the folded airbag.

8 Claims, 3 Drawing Sheets

AIRBAG APPARATUS

BACKGROUND OF THE INVENTION AND RELATED ART STATEMENT

The present invention relates to a structure for an airbag apparatus for use in a motor vehicle mounted on the motor vehicle.

Hitherto, an airbag apparatus, in which an airbag is developed and expanded in an occupant restraining area at a time when a motor vehicle accident is caused, is known. Further, in Japanese Patent Publication (KOKAI) No. 11-28997, in this kind of airbag apparatus, a folded shape of the airbag is held by partially applying a holding member constructed of a cloth to the previously folded airbag. However, in designing an airbag apparatus using the holding member, there is a demand effective for enabling to further assuredly hold the folded shape of the airbag, and for stabilizing a quality with regard to holding the folded shape of the airbag.

Accordingly, the present invention is made in consideration of the above-described point of view, and it is an object of the invention to provide a technology effective for assuredly holding the folded shape of the previously folded airbag in the airbag apparatus for use in a motor vehicle.

Further objects and advantages of the invention will be apparent from the following description of the invention.

SUMMARY OF THE INVENTION

The present invention is constructed in order to solve the aforementioned problems. Incidentally, the present invention can be applied to a structure for an airbag apparatus mounted on various types of motor vehicles, such as, automobile, trucks, buses, electric trains, boats and ships, motor cycles, and so forth.

(First Invention)

A first invention of the present invention for solving the aforementioned problems is an airbag apparatus according to first aspect. The airbag apparatus according to the first aspect at least includes an airbag, an airbag housing portion, an airbag cover, a gas-supplying portion, and an airbag-holding member.

The airbag in the present invention is constructed as an airbag expanded while being developed in a predetermined developing and expanding area at a time of a motor vehicle accident, and restraining bodies inside and outside the motor vehicle. An object to be restrained by the airbag includes an occupant seated in a driver's seat, an occupant seated in a passenger seat, an occupant seated in a seat other than the driver's seat or the passenger seat, such as a rear seat, a pedestrian outside a motor vehicle, or the like. Accordingly, in a developing and expanding area where the airbag according to the present invention is developed and expanded, not only an in-car area where an occupant as the restraining object exists, but also an area outside the motor vehicle where the pedestrian as the restraining object exists are widely included.

The airbag housing portion according to the present invention is constructed to house the airbag being folded in a predetermined configuration, and to include an airbag opening that allows the airbag to be developed and expanded. As the "predetermined configuration" described here, a roll-folding configuration formed in a manner such that the airbag is folded in a roll shape, a bellows folding configuration formed in a manner such that the airbag is folded back into a bellows shape, a folding configuration in which these configurations are combined with each other, and the like, are listed. The airbag housed in the airbag housing portion protrudes outside the airbag housing portion through the airbag opening at a time when the airbag is developed and expanded. The airbag opening is covered by means of the airbag cover according to the present invention.

The gas supplying portion according to the present invention has a function for supplying the gas to the airbag for airbag expansion so as to develop and expand the airbag to an occupant restraining area, when the motor vehicle accident occurs. In concrete terms, the gas supplying portion has a construction for generating the gas for expanding the airbag by detecting an occurrence of the motor vehicle accident, and for introducing the gas for airbag expansion into an inside of the airbag.

The airbag-holding member according to the present invention has a function to hold a folded shape of the airbag, while being applied to an external surface of the folded airbag, which is housed in the airbag housing portion, in a partitioned area partitioned by the airbag housing portion and the airbag cover. In particular, in the present invention, the airbag-holding member is constructed such that a film sheet, in which a plurality of resin layers is formed in a layer-stack manner with regard to a sheet cross-sectional direction, is formed into a bag shape that wraps around an entire external surface of the folded airbag. Accordingly, the folded airbag is packaged in a tightly sealed manner by means of the film sheet.

As the film sheet, a film sheet having translucency, a film sheet having no translucency, or the like can appropriately be used. In the present invention, with regard to a construction for forming the film sheet into the bag shape that wraps around the entire external surface of the folded airbag, there may be a construction in which each of outer edge portions of each of film sheet pieces is joined by heat-welding, bonding, or the like, and tightly sealed, upon sandwiching the airbag in the folded condition by means of a plurality of film sheet pieces; a construction in which a piece of film sheet is folded back and formed into a bag shape that wraps around the entire external surface of the folded airbag, and in which each of both end portions of the film sheet is joined by heat-welding, bonding, or the like, and is tightly sealed; and a construction in which an airbag in a folded condition is put into an opening bag-shaped film sheet member that is previously prepared, through the opening thereof, and thereafter an opening portion is bound up and tightly sealed by means of a clamp.

Further, in the present invention, with regard to a construction to form a plurality of resin layers in a layer-stack manner with regard to a sheet cross-sectional direction, a single film sheet having an integrally formed shape including a plurality of resin layers may be used, or a construction in which a plurality of film sheets formed from each resin layer is overlapped on each other in a layer-stack manner may be used.

In accordance with such a construction of the airbag apparatus according to the first aspect, by using an airbag holding member formed from a film sheet having a bag shape that wraps around the entire external surface of the folded airbag, the folded shape of the folded airbag is prevented from being deformed and it becomes possible to assuredly hold the folded shape. Accordingly, it becomes possible for a quality with regard to holding the folded shape of the airbag stably. In addition, in the present invention, since the construction is formed such that the film sheet wraps around the entire external surface of the airbag, there is no possibility that a folded configuration of the airbag is limited by being influenced by a structure at the airbag holding member side. Further, by tightly sealing the folded airbag by means of the film sheet formed into the bag shape, it becomes possible to suppress a deterioration of the airbag.

Furthermore, according to the present invention, a construction in which various functions are applied to a plurality of resin layers of the film sheet is realized. For example, it becomes possible that, in a plurality of resin layers of the film sheet, a first resin layer is formed to be a resin layer having translucency and high strength, and a second resin layer is formed to be a resin layer having the translucency and environmental deterioration resistance. According to such a construction, a further function can be applied to the film sheet constituting the airbag holding member and it is rational.

(Second Invention)

A second invention of the present invention for solving the aforementioned problems is the airbag apparatus according to second aspect. In the airbag apparatus according to the second aspect, the film sheet of the airbag holding member according to first aspect has a construction using a film sheet including a resin layer with a heat-welding characteristic having a heat-welding characteristic, and has a construction in which each of outer edge portions of each of the film sheets is joined and formed into a bag shape by heat-welding at the resin layer with the heat-welding characteristic upon facing two pieces of the film sheets each other in a manner for each of the sides of the resin layers with the heat-welding characteristic to be disposed inside. By means of the construction described above, a surrounding area of the folded airbag is tightly sealed by the film sheet having the bag shape.

According to such a construction of the airbag apparatus according to the second aspect, an airbag holding member, in which two pieces of film sheets are joined by heat-welding into a bag shape, is provided.

(Third Invention)

The third invention of the present invention for solving the aforementioned problems is the airbag apparatus according to a third aspect. In the airbag apparatus according to the third aspect, the film sheet of the airbag holding member according to either one of the first or second aspect has a construction using a film sheet including at least one resin layer in a resin layer having translucency, a resin layer having high strength, and a resin layer having environmental deterioration resistance. The resin layer having the translucency is defined as a resin layer having a function to enable the folded condition of the airbag to be visibly confirmed. With regard to the resin layer having the translucency, it is sufficient that visibility can be obtained through the resin layer regardless of small or large degree of translucency.

As the resin layer, a transparent resin layer and a half transparent resin layer (translucent white resin layer or colored resin layer) can appropriately be used. The resin layer having high strength is defined as a resin layer having a strength capable of holding the folded shape of the airbag against the force of the airbag in a condition being once folded back to release the folded-back condition. The resin layer having the environmental deterioration resistance is defined as a resin layer that is good for anti-weatherability such as, heat resistance, moisture resistance, light stability, and so forth.

In accordance with such a construction of the airbag apparatus according to the third aspect, it becomes possible to provide an airbag apparatus in which the folded shape of the airbag is assuredly held and further, to provide an airbag apparatus in consideration of the visibility of the airbag in the folded-back condition, and the strength of the airbag holding member, or the environmental deterioration resistance.

(Fourth Invention)

The fourth invention of the present invention for solving the aforementioned problems is the airbag apparatus according to a forth aspect. In the airbag apparatus according to the forth aspect, the airbag holding member according to any one of the aspects 1 through 3 has a construction in which a volume of the airbag is reduced by compressing the folded airbag from outside of the airbag through the bag-shaped film sheet. With regard to the compressing operation for the folded airbag, an internal part of the film sheet is formed in a decompressed condition by vacuuming in a condition of housing the airbag in a film sheet formed in a bag-shaped manner, or by pressurizing the film sheet itself from outside.

In accordance with such a construction of the airbag apparatus according to the forth aspect, a size occupied by the folded airbag held by the airbag holding member can be suppressed and an entire airbag apparatus is made in a compact-size.

As described above, according to the present invention, in the airbag apparatus for use in the motor vehicle mounted on the motor vehicle, particularly, in the partitioned area that is partitioned by the airbag housing portion and the airbag cover, the airbag-holding member is disposed to an external surface of the folded airbag, and the airbag is held in the folded shape by the airbag holding member. Also, the airbag holding member is formed such that a film sheet, in which a plurality of resin layers is formed in a layer-stack manner with regard to a sheet cross-sectional direction, has a bag shape that wraps around an entire external surface of the folded airbag. Accprdingly, the folded shape of the airbag in the folded condition is prevented from being deformed and it becomes possible to assuredly hold the folded shape.

DETAILED DESCRIPTION OF THE EMBODIMENTS

Figure 1:
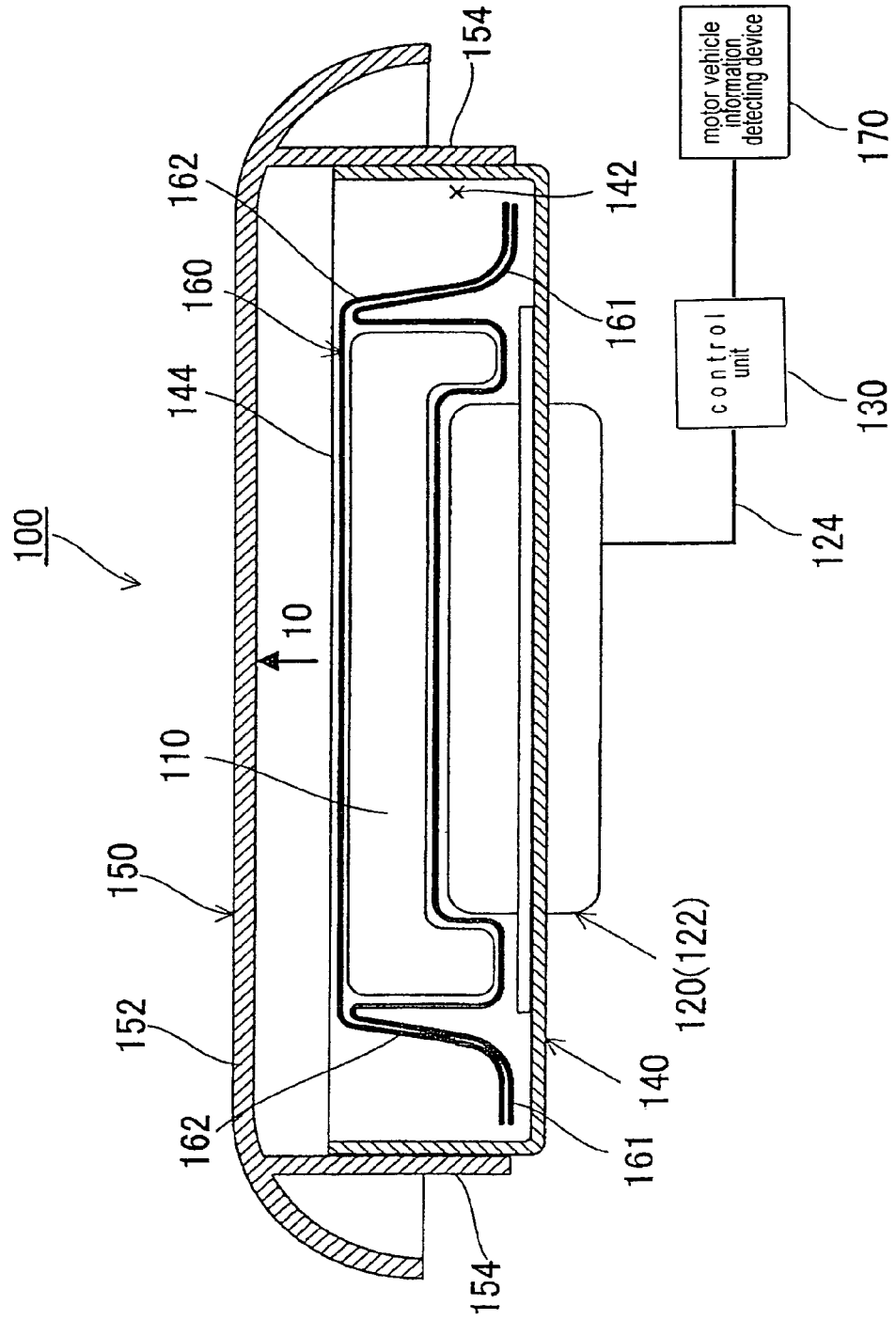
FIG. 1 is a view showing a cross-sectional structure of an airbag apparatus as an embodiment of an airbag apparatus of the present invention.

Hereinafter, embodiments of the present invention will be explained in detail referring to the drawings. First, a construction of an airbag apparatus 100 of the present embodiment will be explained referring to FIGS. 1 through 4. The airbag apparatus 100 is, although not particularly shown, an apparatus that is mounted corresponding to an occupant seated in a driver's seat of an automobile motor vehicle (hereinafter referred to as motor vehicle occupant), and is provided with a construction to be built in a steering wheel for steering the motor vehicle.

A cross-sectional structure of the airbag apparatus 100 serving as an embodiment of "an airbag apparatus" in the present invention is shown in FIG. 1. The airbag apparatus 100 is at least provided with an airbag 110, an inflator 120, a control unit 130, a retainer 140, an airbag cover 150, and an airbag-holding member 160, as basic components.

The airbag 110 has a bag shape that is developed and expanded so as to restrain the motor vehicle occupant at a time of a motor vehicle accident, and is formed by stitching a piece of or a plurality of pieces of base cloths of the airbag formed from synthetic resin into a bag shape. Further, the airbag 110 is housed in the retainer 140 in a folded condition folded back in a predetermined configuration. As the "predetermined configuration" described above, there are a roll-folding configuration formed in a manner such that the airbag 110 is retracted to have a roll shape, a bellows folding configuration that is formed in a manner such that the airbag 110 is folded back to have a bellows shape, a folding configuration in which these configurations are combined with each other, or the like. The airbag apparatus 110 described here corresponds to the "airbag for use in restraining an occupant" in the present invention.

The inflator 120 includes a gas-generating portion 122 generating gas for developing and expanding the airbag 110, in an internal space of the airbag 110 constructed to have a bag shape. The gas-generating portion 122 is connected to the control unit 130 via a harness 124 and generates the gas for developing and expanding the airbag 110 by activating an output of a control signal from the control unit 130. This gas for developing and expanding the airbag 110 generated in the gas-generating portion 122 is to be supplied to an internal part of the airbag 110 through a gas-distributing path (not shown).

The control unit 130 is composed of a CPU (Central Processing Unit) having a known construction, a ROM, a RAM, an input and output device, a peripheral device (illustration of any of these devices are omitted), and the like. Further, the control unit 130 is connected to a motor vehicle information detecting device 170 serving as a component of a motor vehicle side, and outputs a control signal to the gas generating portion 122 on the basis of information transmitted from the motor vehicle information detecting device 170. Typically, a collision detecting sensor that detects occurrence of the motor vehicle collision on the basis of acceleration or the like applied to the motor vehicle is used, as the motor vehicle information detecting device 170. The inflator 120 described here corresponds to a "gas supplying portion" in the present invention.

The retainer 140 is constructed as a box-shaped case member having a bottom provided with a function for housing the airbag 110 having the aforementioned construction, and the inflator 120. Namely, in a housing space 142 of the retainer 140 for housing the inflator 120, the inflator 120 is housed at a lower part thereof, and the airbag 110 is housed above the housed inflator 120. At an upper part of the retainer 140, an airbag opening 144 that opens so as to allow the developing and expanding operations of the airbag 110 in the housed condition is formed. The airbag 110 protrudes in a direction indicated by an arrow 10 in FIG. 1, while being developed and expanded through the airbag opening 144 at a time of occurrence of the motor vehicle accident. The retainer 140 is constructed with using a molded member formed from a metal material or a resin material. The retainer 140 described here corresponds to the "airbag housing portion" in the present invention, and the airbag opening 144 of the retainer 140 corresponds to the "airbag opening" in the present invention.

The airbag cover 150 is made of a resin-material, that covers the airbag opening 144 of the retainer 140 from above in a housed condition that the airbag 110 is housed in the retainer 140. Accordingly, the motor vehicle occupant side of the airbag 110 is covered by the airbag cover 150. The airbag cover 150 is, concretely, provided with a flat plate portion 152 horizontally extending along an opening plane of the airbag opening 144, and a standing portion 154 standing along a wall portion of the retainer 140 from the flat plate portion 152. The airbag cover 150 is attached to and fixed to a retainer 140 side at the standing portion 154.

In addition, although not shown, a reduced-thickness portion in which a plate thickness at the flat plate portion 152 and the standing portion 154 is relatively reduced, namely a so-called tear line is provided in the airbag cover 150. The airbag cover 150 is ruptured at the tear line thereof, resulting in allowing the airbag opening 144 to form an open condition at a time of developing and developing operations of the airbag 110 when a motor vehicle accident such as a motor vehicle collision is caused. In addition, the airbag cover 150 allows the airbag 110 to protrude outside the retainer 140 through the airbag opening 144. The airbag cover 150 corresponds to the "airbag cover" in the present invention.

Figure 2:
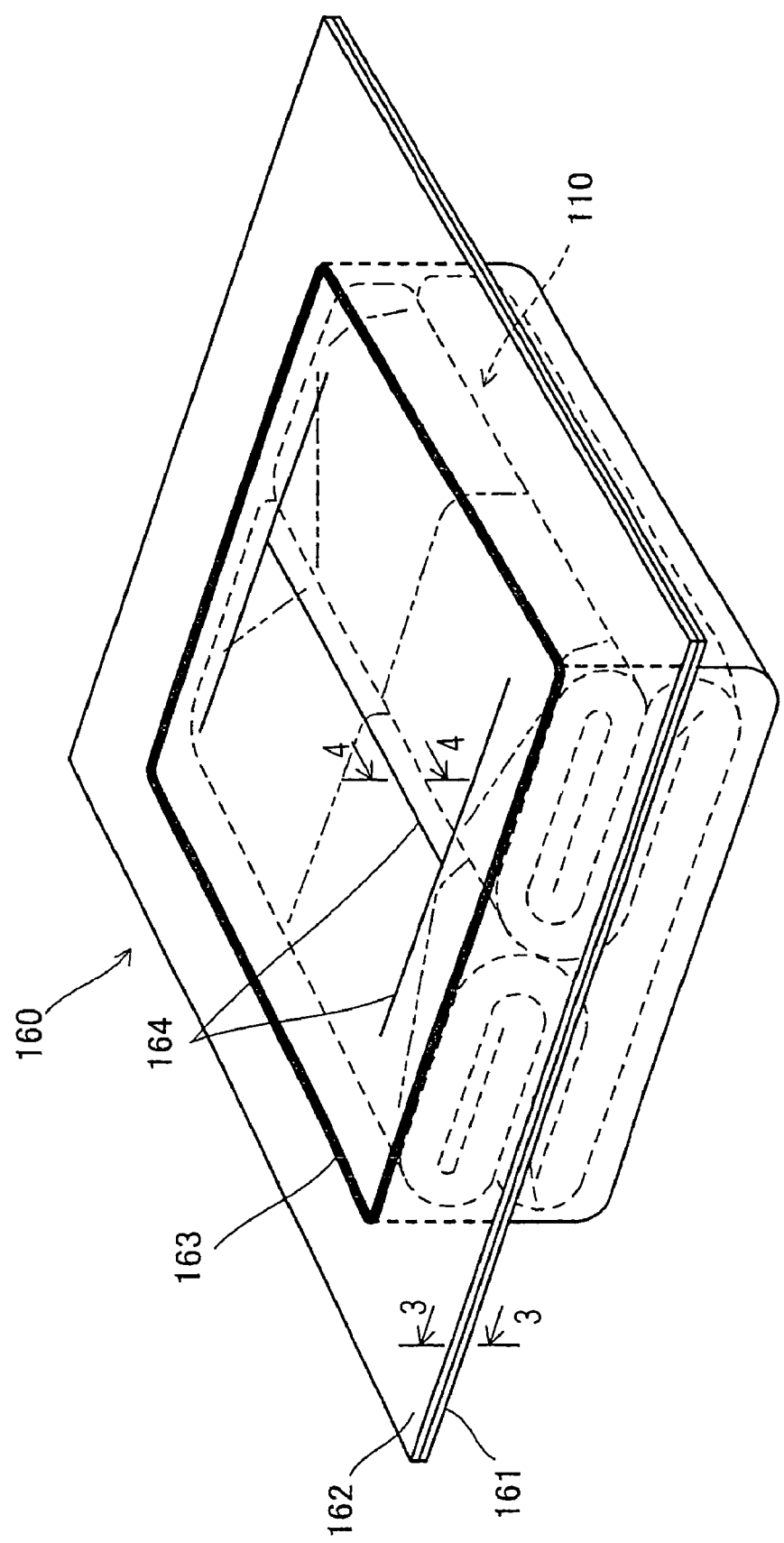
FIG. 2 is a view showing a condition in which the airbag in a folded condition in the present embodiment is held by an airbag-holding member.
Figure 3:
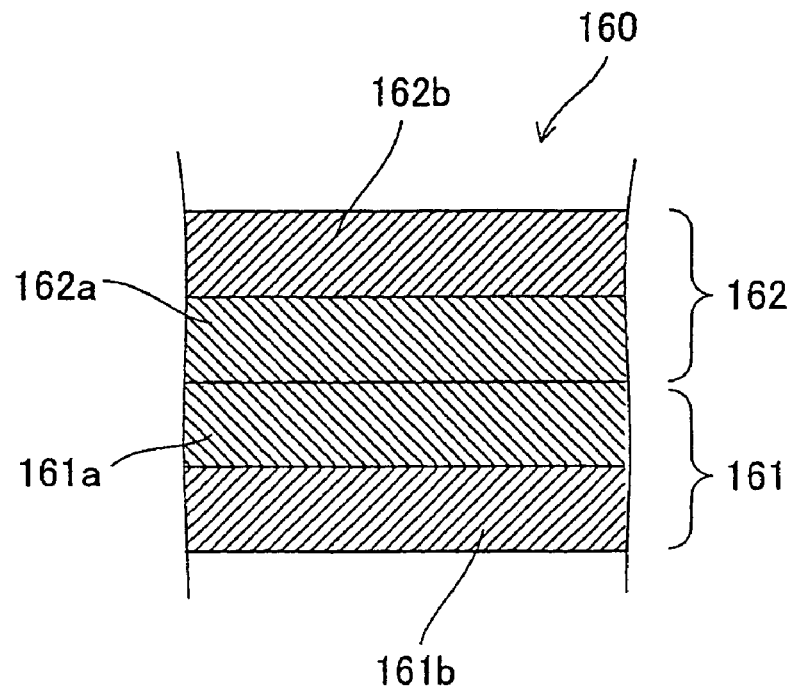
FIG. 3 is a view showing a cross-sectional structure taken along line 3-3 of the airbag-holding member in FIG. 2.
Figure 4:
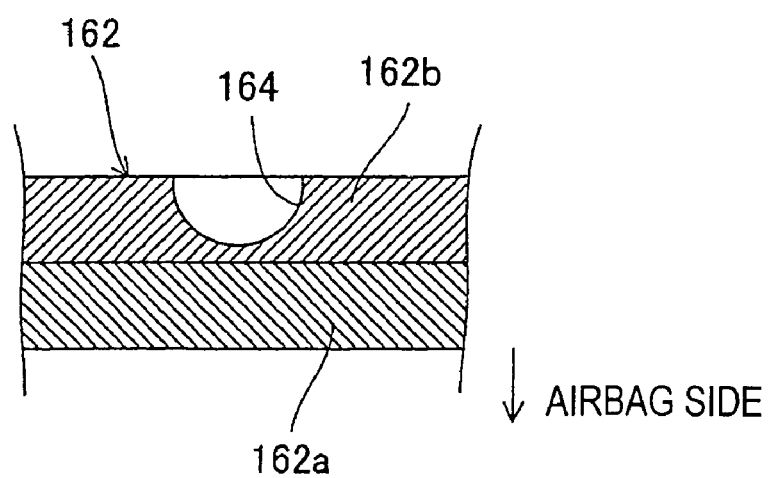
FIG. 4 is a view showing a cross-sectional structure taken along line 4-4 of the airbag-holding member in FIG. 2.

The airbag-holding member 160 is a member provided with a function to hold (or may sometimes be called "to maintain") a folded shape of the airbag 110 by providing a film sheet having translucency in an adhering manner, at an external surface of the folded airbag 110 folded in a predetermined configuration. The airbag-holding member 160 described here corresponds to the "airbag-holding member" in the present invention. The airbag-holding member 160 is constructed by joining a lower film sheet 161 and an upper film sheet 162 each other into a bag shape, and thereafter sandwiching the folded airbag 110 between the lower film sheet 161 and the upper film sheet 162. Here, a condition in which the folded shape of the folded airbag 110 of the present embodiment is held by means of the airbag-holding member 160 is shown in FIG. 2. Further, a cross-sectional structure with regard to line 3-3 of the airbag-holding member 160 in FIG. 2 is shown in FIG. 3, and a cross-sectional structure along line 4-4 of the airbag-holding member 160 in FIG. 2 is shown in FIG. 4.

As shown in FIG. 2, each of the two pieces of the lower film sheet 161 and the upper sheet 162 constituting the airbag-holding member 160 in the present embodiment is formed from a sheet-shaped film sheet having translucency. In the airbag-holding member 160, an outer peripheral edge portion of the lower film sheet 161 and an outer peripheral edge portion of the upper film sheet 162 are overlapped on each other and heat-welded (joined) to each other at a heat-welding portion 163. The heat-welded lower film sheet 161 and the upper film sheet 162 are formed into a bag shape.

In the present embodiment, the folded airbag 110 is sandwiched by the lower film sheet 161 and the upper film sheet 162 and thereafter each of the outer peripheral edges of each of the film sheets are sealed. Therefore, the airbag-holding member 160 is configured into an airbag-packaging condition (sometimes called "airbag-sealing condition", "airbag tight-sealing condition", or "airbag-packing condition") in which an entire external surface of the folded airbag 110 is wrapped up with the lower film sheet 161 and the upper film sheet 162. In the airbag-packaging condition of the airbag-holding member 160, the folded shape of the airbag 110 in a folded condition is configured to be assuredly held by means of the airbag-holding member 160.

Incidentally, with regard to the airbag-packaging condition, it is preferable to construct the airbag 110 to have a reduced volume by compressing the folded airbag 110 via the bag-shaped film sheet from outside. With regard to compressing the folded airbag 110, an internal part of the film sheet is formed to be in a decompressed condition by vacuuming in a condition of housing the airbag 110 in a film sheet formed in a bag-shaped manner, or by pressurizing the film sheet itself from outside. In accordance with such a condition describe above, the size occupied by the folded airbag 110, which is held by means of the airbag-holding member 160 can be suppressed and an entire airbag apparatus 100 becomes compact size.

As shown in FIG. 3, in the airbag-holding member 160 in the present embodiment, each of the lower film sheet 161 and the upper film sheet 162 is configured to be a film sheet having a two-layer structure in which the first resin layer and the second resin layer are disposed in a layer-stack manner with regard to a film cross-sectional direction or a sheet cross-sectional direction. Further, in the airbag-holding member 160, the lower film sheet 161 and the upper film sheet 162 are disposed in a manner such that the first resin layer 161a at a side of the lower film sheet 161 and the first resin layer 162a at a side of the upper film sheet 162 face each other.

The first resin layers, 161a and 162a, are constructed as resin layers at the side of the airbag where the airbag 110 directly contacts therewith, and are constructed to have translucency in the formed condition. In addition, the first resin layers, 161a and 162a, are also constructed to be resin layers having a characteristic of heat-welding (hereinafter referred to as a heat-welding characteristic). The first resin layers, 161a and 162a, correspond to "the resin layer with a heat-welding characteristic" in the present invention. On the other hand, the second resin layers, 161b and 162b, are resin layers provided outside the first resin layers, 161a and 162a, which do not directly contact the airbag 110, and are constructed as a resin layer having the translucency in the formed condition and having high strength.

Incidentally, the film sheet as the airbag-holding member 160 in the present embodiment may be a single film sheet having an integrally formed shape including a portion of the first resin layer 160a and a portion of the second resin layer 160b, or may be a film sheet having a construction in which a film sheet formed from the first resin layer 160a and a film sheet formed from the second resin layer 160b are overlapped on each other in the layer-stack manner.

Further, the present embodiment is constructed to have a portion where a reduced-thickness portion (some times called "weak portion") with regard to a cross-sectional direction is formed in a continuous line, namely a so-called tear line 164, is provided at an upper surface of the upper film sheet 162 positioned above the airbag 110 in a condition being housed in the retainer 140. As shown in FIG. 4, the tear line 164, typically, is formed in the second resin layer 162b in the first resin layer 162a and the second resin layer 162b of the upper film sheet 162.

As for a forming method for forming the tear line 164, a method in which a film is weakened by performing a laser processing to the second resin layer 162b, a method in which the second resin layer 162b is weakened by heating the same with ironing or the like can appropriately be adopted. In this case, a depth of the reduced thickness with regard to a film cross-sectional direction of the tear line 164 can appropriately be set within a limit of a wall thickness of the second resin layer 162b. It is preferable that, for example, the depth of the reduced thickness with regard to the film cross-sectional direction of the tear line 164 is set such that the strength at the tear line 164 is configured to be smaller than the airbag holding force (substantially, the welding strength of the heat-welding portion 163) of the airbag-holding member 160 for holding the folded airbag 110.

According to the airbag apparatus 100 having the above-described construction, the folded shape of the airbag 110 in the folded condition is prevented from being deformed, and it becomes possible for the folded shape to assuredly be held by using the airbag-holding member 160 formed from the film sheet configured to have a bag shape for wrapping around the entire external surface of the folded airbag 110. By thus constructing, it becomes possible for the quality with regard to holding the folded shape of the airbag 110 stably. Further, since the present embodiment has a construction in which the entire external surface of the airbag 110 is wrapped with the film sheet, there is no possibility such that the folded configuration of the airbag 110 is limited by being influenced by the structure of the airbag-holding member 160 side. Furthermore, by sealing the folded airbag 110 with the bag-shaped film sheet, deterioration of the airbag 110 can be suppressed.

Moreover, in the present embodiment, since the airbag-holding member 160 is formed from the translucent film sheet, the airbag-holding member 160 is provided with a function in which the folded condition of the airbag 110 can be visibly confirmed at and after a time when the airbag-holding member 160 is mounted, in addition to the original function for holding the folded shape of the airbag 110 in the folded condition. As for the translucency of the film sheet, it is sufficient that the translucent film sheet enables visible confirmation through the film sheet regardless of the small or large degree of translucency. As the film sheet, a transparent film sheet and a half transparent film sheet (translucent white film sheet or colored film sheet) can appropriately be used. By such a construction of the airbag apparatus 100 described above, since it is possible to visibly confirm whether the folded shape of the airbag 110 in the folded condition is maintained (kept) without being deformed, through the airbag-holding member 160 as needed, it becomes possible for the quality with regard to the holding operation for the folded shape of the airbag 110 stably.

Further, in the airbag apparatus 100 having the aforementioned construction, when the airbag 110 is developed and expanded at the time of occurrence of the motor vehicle accident, the developing and expanding force is exerted to an internal surface of the airbag-holding member 160. In this case, the strength of the tear line 164 of the airbag-holding member 160 is configured to be smaller than the holding force of the film sheet for holding the folded airbag 110, and thereby the airbag-holding member 160 is ruptured at the tear line 164 and releases the holding operation for the folded shape of the airbag 110.

In addition, the airbag-holding member 160 allows a developing and expanding operation and a protruding out operation of the airbag 110 in a direction to the airbag cover 150 side. At this moment, in the airbag-holding member 160 in the present embodiment, the second resin layer 161b and the second resin layer 162b each having high strength are disposed at an outside thereof and thereby it becomes possible to secure film strength of the airbag-holding member 160 itself. Consequently, it is effective for further assuredly holding the folded shape of the airbag 110 in the folded condition after the airbag-holding member 160 is mounted as well.

As described above, in the present embodiment, a further function with regard to the strength can be applied to the first resin layers, 161a and 162a, and the second resin layers, 161b and 162b, of the film sheet constituting the airbag-holding member 160 in addition to the translucency, resulting in forming a rational configuration.

Further, the airbag 110 causes the airbag cover 150 to be ruptured along the tear line 164 at a time of developing and developing operations thereof, and protrudes outside the retainer 140 through the airbag opening 144. Thus, the airbag 110 developed and expanded in a predetermined occupant restraining area is configured to restrain the motor vehicle occupant.

Other Embodiments

Incidentally, the present invention is not limited to only the aforementioned embodiment and various applications and modifications are considered. For example, each of the following embodiments in which the aforementioned embodiment is applied can also be performed.

In the aforementioned embodiment, the airbag-holding member 160 is constructed by using the film sheet having the two-layer structure where the first resin layer and the second resin layer are disposed in a layer-stack manner. However, in the present invention, the airbag-holding member may be constructed by using a film sheet having a multilayer structure in which another resin layer is disposed in a layer-stack manner in addition to this film sheet having the two-layer structure. In this case, as a resin layer to be added, a resin layer having a translucency and an environmental deterioration resistance can be used. The resin layer having the environmental deterioration resistance described here is defined as a resin layer that is good at anti-weatherability such as, heat resistance, moisture resistance, light stability, and so forth. Such a resin layer having environmental deterioration resistance described above is particularly effective in the airbag apparatus installed at a place, which is easy to be exposed to the open air environment as a motor vehicle.

Further, in the aforementioned embodiment, each of the outer edge portions of each of the film sheets is sealed by heat-welding upon sandwiching the folded airbag 110 by means of the lower film sheet 161 and the upper film sheet 162. However, in the present invention, instead of this construction, it is possible to have a construction in which one piece of a film sheet is folded back and formed into a bag shape for wrapping an entire external surface of an folded airbag, and each of both end portions of the film sheet is joined by heat-welding, bonding, or the like, resulting in sealing the airbag, or a construction in which an folded airbag is put into an opening bag-shaped film sheet member that is previously prepared, through the opening thereof, and thereafter an opening portion is bound up and sealed by means of a clamp.

Furthermore, in the aforementioned embodiment, an airbag apparatus mounted corresponding to the motor vehicle occupant seated in the driver's seat of the automobile is described. However, the present invention can also be applied to a construction of an airbag apparatus mounted corresponding to a motor vehicle occupant seated in a seat other than that of the driver's seat, for example, the motor vehicle occupant seated in a passenger seat, in a rear seat, or further, a pedestrian outside the motor vehicle. With regard to an airbag apparatus for restraining the pedestrian outside the motor vehicle, the airbag apparatus can typically be mounted on a bonnet portion, a cowl portion, an A-pillar portion, or the like of a motor vehicle.

Moreover, in the aforementioned embodiment, the airbag apparatus to be mounted on the automobile motor vehicle is described. However, the present invention can also be applied to a construction of an airbag apparatus in a motor vehicle other than an automobile, for example, a truck, a bus, an electric train, boats and ships, a motor cycle, or the like.

The disclosure of Japanese Patent Application No. 2005-365144 filed on Dec. 19, 2005 is incorporated as a reference.

What is claimed is:

1. An airbag apparatus mounted on a vehicle comprising:
    an airbag;
    an airbag housing portion for housing the airbag folded in a predetermined configuration, said airbag housing portion having an airbag opening for allowing the airbag to be developed and expanded;
    an airbag cover for covering the airbag opening;
    a gas-supplying portion for supplying gas to the airbag to expand the airbag in a developing and expanding area when a motor vehicle accident occurs; and
    an airbag-holding member for holding a folded shape of the airbag while covering an external surface of a folded airbag housed in the airbag housing portion in a partitioned area partitioned by the airbag housing portion and the airbag cover, said airbag-holding member comprising a film sheet formed of a plurality of resin layers laminated together to have a bag shape wrapping around an entire external surface of the folded airbag,
    wherein the film sheet includes a heat-welding resin layer with a heat-welding characteristic, two pieces of the film sheets being arranged to face each other in a manner that each side provided with the resin layer with the heat-welding characteristic is disposed inside so that each of outer edge portions of the film sheets is joined by heat-welding at the resin layers with the heat-welding characteristic to form into the bag shape, and
    wherein one of the resin layers forming the film sheet disposed immediately under the airbag cover includes reduced-thickness portions forming tear lines, said reduced thickness portions having a depth within a limit of a wall thickness of said one of the resin layers without penetrating into a next layer.

2. An airbag apparatus according to claim 1, wherein the film sheet includes at least one of a resin layer having translucency, a resin layer having high strength, and a resin layer having an environmental deterioration resistance.

3. An airbag apparatus according to claim 1, wherein the airbag-holding member has a construction in which a volume of the airbag is reduced by compressing the folded airbag from outside of the airbag through the film sheet having the bag shape.

4. An airbag apparatus according to claim 1, wherein the airbag-holding member completely encloses the airbag to seal the same.

5. An airbag apparatus according to claim 1, wherein the plurality of resin layers comprises two translucent resin layers having high strength and environmental deterioration resistance.

6. An airbag apparatus according to claim 1, wherein the plurality of resin layers comprises an inner layer as the heat-welding resin layer, and an outer layer integrally laminated with the inner layer.

7. An airbag apparatus according to claim 6, wherein the outer layer has tear lines only partly penetrating therethrough.

8. An airbag apparatus according to claim 1, wherein said reduced-thickness portions extend continuously in said one of the resin layers.

* * * * *